US010316129B2

(12) United States Patent
Seo et al.

(10) Patent No.: US 10,316,129 B2
(45) Date of Patent: Jun. 11, 2019

(54) RESIN COMPOSITION FOR GOLF BALL COVER

(71) Applicant: SKC CO., LTD., Gyeonggi-do (KR)

(72) Inventors: Jang Won Seo, Busan (KR); Junghwan Shin, Gyeonggi-do (KR); Jongmin Shim, Gyeonggi-do (KR)

(73) Assignee: SKC CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/345,129

(22) Filed: Nov. 7, 2016

(65) Prior Publication Data

US 2017/0129985 A1    May 11, 2017

(30) Foreign Application Priority Data

Nov. 6, 2015 (KR) .................. 10-2015-0156045

(51) Int. Cl.

| *A63B 37/12* | (2006.01) |
| *C08G 18/12* | (2006.01) |
| *C08K 5/12* | (2006.01) |
| *C08G 18/08* | (2006.01) |
| *A63B 37/00* | (2006.01) |
| *C08G 18/10* | (2006.01) |
| *C08G 18/66* | (2006.01) |
| *C08G 18/76* | (2006.01) |
| *C08G 18/48* | (2006.01) |
| *C08G 18/32* | (2006.01) |
| *C08K 5/11* | (2006.01) |

(52) U.S. Cl.
CPC ...... *C08G 18/0838* (2013.01); *A63B 37/0023* (2013.01); *A63B 37/0074* (2013.01); *A63B 37/12* (2013.01); *C08G 18/10* (2013.01); *C08G 18/3206* (2013.01); *C08G 18/4808* (2013.01); *C08G 18/4825* (2013.01); *C08G 18/4854* (2013.01); *C08G 18/6674* (2013.01); *C08G 18/7621* (2013.01); *C08K 5/11* (2013.01); *C08K 5/12* (2013.01)

(58) Field of Classification Search
None
See application file for complete search history.

(56) References Cited

U.S. PATENT DOCUMENTS

| 3,714,110 A * | 1/1973 | Verdol ...................... A61F 5/44 524/848 |
| 3,778,487 A * | 12/1973 | Driscoll ................... C10M 3/00 208/19 |
| 4,102,716 A * | 7/1978 | Groves ................ C08G 18/242 156/48 |
| 4,152,309 A * | 5/1979 | Ijichi ...................... C08G 18/69 524/145 |
| 4,168,258 A * | 9/1979 | Brauer ................... C08G 18/36 524/140 |
| 6,309,313 B1 * | 10/2001 | Peter ................... A63B 37/0003 264/271.1 |
| 6,503,157 B2 | 1/2003 | Yokota .................... A63B 37/12 |
| 7,053,142 B2 | 5/2006 | Sullivan ....................... 524/310 |
| 2017/0001079 A1 * | 1/2017 | Sullivan ............. A63B 37/0092 |

FOREIGN PATENT DOCUMENTS

| JP | 62-263216 | 11/1987 |
| JP | 8-41156 | 2/1996 |
| JP | H11-349656 | 12/1999 |
| JP | 2002-017901 | 1/2002 |
| JP | 2005-185836 | 7/2005 |
| KR | 10-2014-0092575 | 7/2014 |

OTHER PUBLICATIONS

Alger, Polymer Science Dictionary; (2000) p. 350. (Year: 2000).*
Coutinho, Kinetic Study of the Reaction Between Hydroxylated Polybutadienes and Isocyanates II. Journal of Applied Polymer Science Part A (1986) pp. 3021-3032. (Year: 1986).*
Chem Spider entry for 4,4' methylenedianiline . No date.*
Office Action dated May 1, 2017 in Taiwan Patent Application No. 105134589.

* cited by examiner

*Primary Examiner* — David J Buttner
(74) *Attorney, Agent, or Firm* — Harness, Dickey & Pierce, P.L.C.

(57) ABSTRACT

The present invention provides a resin composition for a golf ball cover, wherein, since the resin composition for a golf ball cover according to the present invention minimizes changes in physical properties due to temperature changes and improves restitution characteristics, the resin composition for a golf ball cover may reduce performance deviations of a golf ball due to seasonal temperature changes and may improve a spin rate of the golf ball.

4 Claims, 3 Drawing Sheets

RESIN COMPOSITION FOR GOLF BALL COVER

CROSS-REFERENCE TO RELATED APPLICATIONS

This application claims the benefit and priority of Korean Patent Application No. 10-2015-0156045 filed on Nov. 6, 2015. The entire disclosure of the above application is incorporated herein by reference.

FIELD

The present disclosure relates to a resin composition for a golf ball cover.

BACKGROUND

Research has continued to develop golf balls which allow a golfer to put a lot of spin when hitting the ball do not wear out easily by repeated hitting, and achive an improved flight distance. In general, a golf ball is composed of a core and a cover surrounding the core, and particularly, the cover of the golf ball is a part that receives a direct hit, wherein hardness, wear resistance, and scuff resistance are important, and excellent restitution characteristics for hitting as well as flexible and soft physical properties are also required.

A material for a golf ball cover recently used may include polyurethane which is cast by a casting method, wherein the polyurethane has excellent elasticity to provide a good sense of hit when hitting and increases the number of rotations of the golf ball to allow the golf ball to fly further. Also, since the polyurethane has elasticity, flexibility, and soft physical properties and has excellent wear resistance and scuff resistance against hitting, the polyurethane has been recognized for its value in the premium golf ball market and its market has also tended to gradually expand. For example, Korean Patent Application Laid-open Publication No. 2014-0092575 discloses a resin composition including a chain extender, isocyanate, polyol, organic peroxide, and a montan-based wax, as a polyurethane-based resin composition which may be used as a golf ball cover.

However, despite the above-described advantages, since the polyurethane is a polymer that sensitively reacts to a change in temperature, physical properties may change under low and high temperature conditions due to seasonal changes. As a result, even if a hit is applied with the same intensity, there is a part in which the number of rotations and restitution characteristics may vary depending on season or surrounding environmental influences.

Thus, the present inventors devised a resin composition for a polyurethane golf ball cover, which may have a higher number of rotations when being hit, by minimizing changes in physical properties of a ball due to seasonal temperature changes and further improving modulus properties, thereby leading to the completion of the present invention.

SUMMARY

Technical Problem

Thus, an object of the present invention is to provide a resin composition for a polyurethane golf ball cover, which has improved modulus properties to enable a ball to make a higher number of spin when being hit, and minimizes changes in physical properties of a ball due to seasonal temperature changes.

Another object of the present invention is to provide a golf ball including a cover which is formed by using the resin composition.

Another object of the present invention is to provide a method of manufacturing a golf ball cover by curing the resin composition.

Solution to Problem

To achieve the above objects, the present invention provides a two-component type resin composition including:
(a) an NCO-terminated prepolymer and a non-reactive oligomer that does not react with NCO, OH, and $NH_2$; and
(b) an alcohol-based hardener, an amine-based hardener, or both.

To achieve other above objects, the present invention provides a golf ball including a core and a cover surrounding the core,
wherein the cover is formed by using the two-component type resin composition.

To achieve still other above objects, the present invention provides a method of manufacturing a golf ball cover including mixing and curing components (a) and (b) of the two-component type resin composition.

Advantageous Effects

A golf ball manufactured by using a resin composition for a golf ball cover according to the present invention may reduce performance deviations of the golf ball due to seasonal changes and have an improved spin rate by minimizing changes in physical properties depending on temperature and improving restitution characteristics.

DETAILED DESCRIPTION

Figure 1:
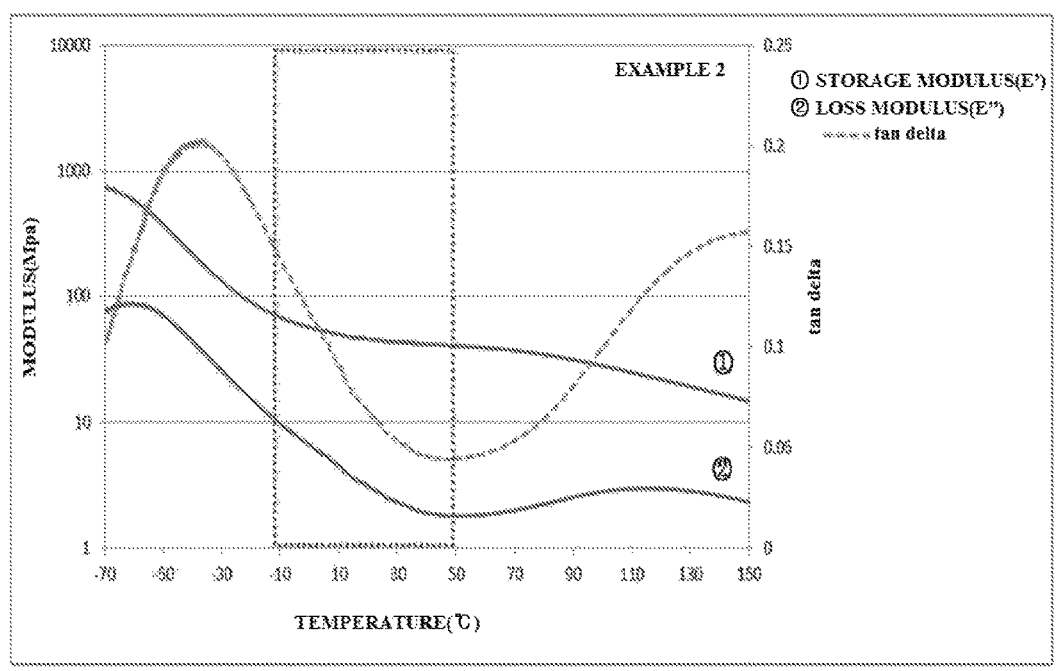
FIG. 1 is a graph of storage and loss modulus versus temperature of a golf ball cover which is formed by curing a resin composition including a non-reactive oligomer prepared in Example 2.

Hereinafter, the present invention will be described in more detail.

In general, a golf ball is composed of a core and a cover surrounding the core. The present invention particularly relates to a resin composition for preparing a cover in a golf ball, and specifically, provides a two-component type resin composition including (a) an NCO-terminated prepolymer and a non-reactive oligomer that does not react with NCO, OH, and $NH_2$; and (b) an alcohol-based hardener, an amine-based hardener, or both. Detailed descriptions of each component of the two-component type resin composition are as follows.

The prepolymer generally means a polymer having a relatively low molecular weight whose polymerization is stopped at an intermediate stage to facilitate molding a final article. The prepolymer may be molded as it is or by reacting with other monomers, and, in the present invention, the prepolymer may be prepared by reaction of isocyanate with polyol.

The isocyanate used in the preparation of the prepolymer may be at least one isocyanate selected from the group consisting of naphthalene-1,5-diisocyanate, paraphenylene diisocyanate, tolidine diisocyanate, diphenylmethane diisocyanate, toluenediisocyanate, hexamethylene diisocyanate, dicyclohexylmethane diisocyanate, and isoporone diisocyanate.

The polyol used in the preparation of the prepolymer may be at least one polyol selected from the group consisting of polyether polyol, polyester polyol, polycarbonate polyol, and acryl polyol. The polyol may have a weight-average molecular weight of 300 to 5,000.

The prepolymer is formed of a polymer compound having an NCO end group which is formed by the reaction of the isocyanate with the polyol as described above. The prepolymer may have a weight-average molecular weight of 1,000 to 5,000.

The non-reactive oligomer included in the resin composition according to the present invention is a compound having a $CH_3$ end group. Since the non-reactive oligomer is present in and mixed with the resin composition but does not directly react with an NCO end group of the prepolymer, an OH end group of the alcohol-based hardener, and an $NH_2$ end group of the amine-based hardener, the resin composition comprising the non-reactive oligomer allows the preparation of a golf ball cover in which elasticity, flexibility, and stretchability are excellently maintained while minimizing changes in physical properties depending on a change in temperature.

The non-reactive oligomer may include at least one oil selected from the group consisting of aromatic oil, aliphatic oil, and paraffin oil, and, for example, preferably includes aromatic mineral oil, aliphatic mineral oil, and paraffin oil which are obtained from minerals. However, the oil of the present invention is not limited thereto, and mineral oil and synthetic oil may be used alone or in a mixture thereof.

Furthermore, the non-reactive oligomer may further include at least one compound selected from the group consisting of dioctyl terephthalate, octvl nonyl terephthalate, dioctyl phthalate, diisononyl phthalate, diisodecyl phthalate, dipropylheptyl phthalate, trioctyl trimellitate, dioctyl adipate, di(2-ethylhexyl) adipate, dimethyl adipate, dibutyl sebacate, dibutyl maleate, diisobutyl maleate, triethylene glycol dihexanoate, tetraethylene glycol diheptanoate, and bis(2-ethylhexyl)terephthalate.

When the resin composition including the non-reactive oligomer is used as a golf ball cover, the sense of hit and the spin rate of the golf ball may be improved by minimizing changes in physical properties of the golf ball due to seasonal temperature changes and improving the restitution characteristics. Furthermore, the non-reactive oligomer may have a weight-average molecular weight of 100 to 5,000.

Also, the non-reactive oligomer may be included in an amount of 0.2 parts by weight to 20 parts by weight, for example, 5 parts by weight to 10 parts by weight, based on 100 parts by weight of the prepolymer. When the non-reactive oligomer is included within the above range, physical properties of the resin composition including the non-reactive oligomer are constant, and the elasticity, flexibility, and stretchability may be excellently maintained.

The hardener included in the resin composition according to the present invention may include at least one compound selected from the group consisting of aromatic amine, aliphatic amine, aromatic alcohol, and aliphatic alcohol, and, for example, preferably includes at least one compound selected from the group consisting of diethyltoluenediamine, diaminodiphenyl methane, diaminodiphenyl sulphone, M-xylylene diamine, isophorone diamine, ethylenediamine, diethylenetriamine, triethylenetetramine, 4,4'-methylenebis (2-chloroaniline) (MOCA), polypropylenediamine, polypropylenetriamine, ethylene glycol, diethylene glycol, dipropylene glycol, butanediol, hexanediol, glycerine, and trimethylolpropane.

The amine-based hardener having an $NH_2$ end group and the alcohol-based hardener having an OH end group react with the prepolymer to form a urethane bond and a urea bond, thereby improving properties of the resin composition, such as elasticity, scuff resistance.

The hardener may be included in an amount of 90% to 110%, for example, 95% to 105% of an equivalent weight of the NCO of the prepolymer.

The present invention provides a golf ball including a core and a cover surrounding the core, wherein the cover is formed by using the resin composition.

A synthetic rubber may be used as the core of the golf ball, but the core of the present invention is not limited thereto, and a butadiene rubber, a styrene butadiene rubber, and a polychloroprene rubber may be used. The cover may be prepared by casting the two-component type resin composition including the prepolymer, the non-reactive oligomer, and the hardener to surround the core, but the present invention is not limited thereto.

The final product, golf ball cover, which is formed by reacting and curing the prepolymer, the non-reactive oligomer, and the hardener, is a thermosetting polyurethane. Since the thermosetting polyurethane has excellent heat resistance, chemical resistance, and hardness, it may improve the scuff resistance of the golf ball cover.

The cover of the golf ball may satisfy 100% or less, for example, 90% or less, as a value of the following equation 1, and may satisfy 500% or less, for example, 400% or less, as a value of the following equation 2. A storage or loss modulus at 20° C. in the following equations 1 and 2 represents a median value of a storage or loss modulus at −10° C. and a storage or loss modulus at 50° C.

$$\frac{\left| \text{Storage modulus at } 50° \text{ C. } (E'_{50}) - \text{Storage modulus at } -10° \text{ C. } (E'_{-10}) \right|}{\text{Storage modulus at } 20° \text{ C. } (E'_{20})} \times 100 \qquad \text{[Equation 1]}$$

$$\frac{\left| \text{Loss modulus at } 50° \text{ C. } (E''_{50}) - \text{Loss modulus at } -10° \text{ C. } (E''_{-10}) \right|}{\text{Loss modulus at } 20° \text{ C. } (E''_{20})} \times 100 \qquad \text{[Equation 2]}$$

In the present invention, a golf ball cover is manufactured by mixing and curing the above-described two-component type resin composition including the NCO-terminated prepolymer and the non-reactive oligomer that does not react with NCO, OH, and $NH_2$; and the alcohol-based hardener, the amine-based hardener, or both.

The golf ball cover may be prepared by a casting method in which a first liquid including the prepolymer and the non-reactive oligomer and a second liquid including the hardener are injected into a mold surrounding the golf ball core. The first liquid is prepared by mixing isocyanate and polyol to prepare an NCO-terminated prepolymer and then mixing the prepolymer with a non-reactive oligomer that does not react with NCO, OH, and $NH_2$; and the second liquid is prepared by using an alcohol-based hardener or an amine-based hardener alone or together. The mold into which the resin composition is injected may be cured at 30° C. to 70° C. for 10 minutes to 60 minutes, and the composition may then be demolded and aged at room temperature for 15 hours to 40 hours to manufacture a golf ball cover.

EXAMPLE

Hereinafter, the present invention is explained in detail by Examples. The following Examples are intended to further illustrate the present invention without limiting its scope.

Example 1

Preparation of Test Pieces of Resin Composition for Golf Ball Cover

Step 1: Preparation of Prepolymer
Toluene diisocyanate (BASF SE, Lupranate® T80, 208 g), polytetramethylene glycol (KOREA PTG Co., Ltd., PTMG2000, 597 g), polypropylene glycol (SKC, DF-1000, 179 g), and dipropylene glycol (SKC, DPG, 16 g) were mixed and reacted at 80° C. for 8 hours to prepare a prepolymer (weight-average molecular weight of 1,700) having an NCO end group.
Step 2: Preparation of Test Pieces of Resin Composition Including Non-Reactive Oligomer
The prepolymer (1,000 g) having an NCO end group prepared in step 1, octvl nonvl terephthalate (100 g) as a non-reactive oligomer, and diethyltoluenediamine (Lonza Group AG, Lonzacure DETDA80, 105 g), as a hardener, were injected into a rectangular mold having a size of 20 cm ×20 cm and a thickness of 5 mm, cured at 50° C. for 20 minutes, demolded from the mold, and aged at room temperature for 24 hours to prepare test pieces of a resin composition including a non-reactive oligomer.

Example 2

Manufacture of Golf Ball Including Golf Ball Cover

Toluene diisocyanate (BASF SE, Lupranate® T80, 208 g), polytetramethylene glycol (KOREA PTG Co., Ltd., PTMG2000, 597 g), polypropylene glycol (SKC, DF-1000, 179 g), and dipropylene glycol (SKC, DPG, 16 g) were mixed and reacted at 80° C. for 8 hours to prepare a prepolymer (weight-average molecular weight of 1,700) having an NCO end group.
The prepolymer (1,000 g) having an NCO end group, octvl nonvl terephthalate (100 g) as a non-reactive oligomer, and diethyltoluenediamine (Lonza Group AG, Lonzacure DETDA80, 105 g), as a hardener, were injected around a core of a golf ball by a casting method, cured at 50° C. for 20minutes, demolded from the mold, and aged at room temperature for 24 hours to manufacture a golf ball including a cover formed by curing a resin composition including a non-reactive oligomer.

Comparative Example 1

Preparation of Test Pieces of Resin Composition not Including Non-reactive Oligomer Test pieces of a resin composition were prepared in the same manner as in Example 1 except that octvl nonyl terephthalate (100g), as a non-reactive oligomer, was not used.

Comparative Example 2

Manufacture of Golf Ball Including Cover Formed by Curing Resin Composition not Including Non-reactive Oligomer A golf ball was manufactured in the same manner as in Example 2 except that octvl nonvl terephthalate (100 g), as a non-reactive oligomer, was not used.

Experimental Example

Hereinafter, in Experimental Examples 1 and 2, the following experiments were performed on the test pieces of the resin compositions prepared in Example 1 and Comparative Example 1.

Experimental Example 1

Evaluation of Glass Transition Temperature (Tg)

Glass transition temperatures of the test pieces of the resin compositions prepared in Example 1 and Comparative Example 1 were measured by analyzing of tan $\delta$ ($=E''/E'$) peak while increasing the temperature at a rate of 10° C. per minute using a dynamic mechanical analyzer (DMA, TA Instruments), and the results thereof are presented in Table 1 below.

Experimental Example 2

Evaluation of Hardness

Hardnesses of the test pieces of the resin compositions prepared in Example 1 and Comparative Example 1 were measured at room temperature with a Shore A type hardness tester, and the results thereof are presented in Table 1 below.

TABLE 1

|  | Example 1 | Comparative Example 1 |
|---|---|---|
| Glass transition temperature (Tg, ° C.) | −38° C. | −30° C. |
| Hardness (Shore A) | 91.5 | 92 |

From the results of Table 1, it was confirmed that the test piece of the resin composition including the non-reactive oligomer prepared in Example 1 had a glass transition temperature and hardness lower than those measured in the test piece of the resin composition not including the non-reactive oligomer prepared in Comparative Example 1. Accordingly, in case of Example 1, flexibility and post-processability were improved while hardness was somewhat decreased.

Hereinafter, in Experimental Examples 3 to 5, the following experiments were performed on the golf balls including the covers formed by curing the resin compositions prepared in Example 2 and Comparative Example 2.

Experimental Example 3

Characterization of Modulus Properties in Accordance with Change in Temperature

Figure 2:
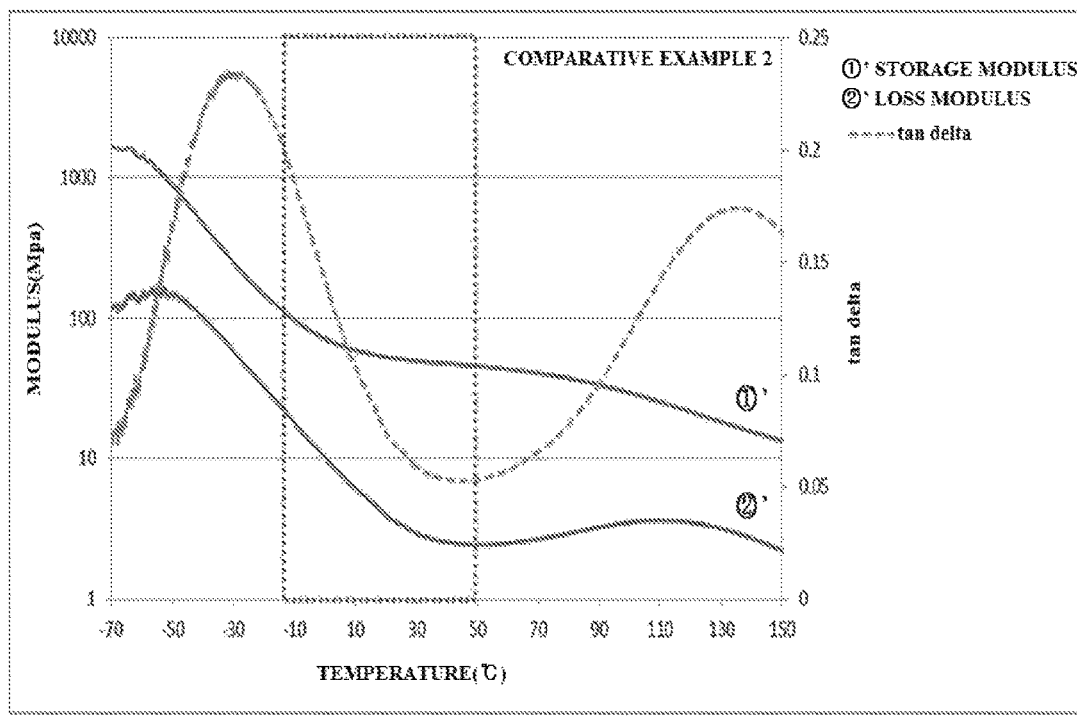
FIG. 2 is a graph of storage and loss modulus versus temperature of a golf ball cover which is formed by curing a resin composition not including a non-reactive oligomer prepared in Comparative Example 2.

In order to evaluate modulus properties of the resin composition including the non-reactive oligomer in accordance with a change in temperature, storage modulus (E') and loss modulus (E") of the golf ball covers formed by curing the resin compositions prepared in Example 2 and Comparative Example 2 were measured using a dynamic mechanical analyzer (dynamic mechanical analysis (DMA), TA Instruments) from −70° C. to 150° C. The measured E' and E" values were applied to equations 1 and 2, and the results are presented in Table 2 below. Furthermore, continuous changes in E', E", and tan δ (=E"/E') values from −70° C. to 150° C. are illustrated in FIGS. 1 and 2.

Experimental Example 4

Ball Rebound Evaluation

In order to evaluate ball rebound of the resin compositions including the non-reactive oligomer, the test pieces having a size of 20 cm×20 cm and a thickness of 5 mm, which include the golf ball covers formed by curing the resin compositions prepared in Example 2 and Comparative Example 2, were put on a floor, a steel ball having a diameter of 15 mm and a weight of 6.3 g was free-fallen 50 cm above the test pieces, and a rebound height was measured to calculate a ratio (%) of the rebound height to an initial height. The test was repeated five times for each test piece, and average values are presented in Table 2 below.

Experimental Example 5

Spin Rate Evaluation

Figure 3:
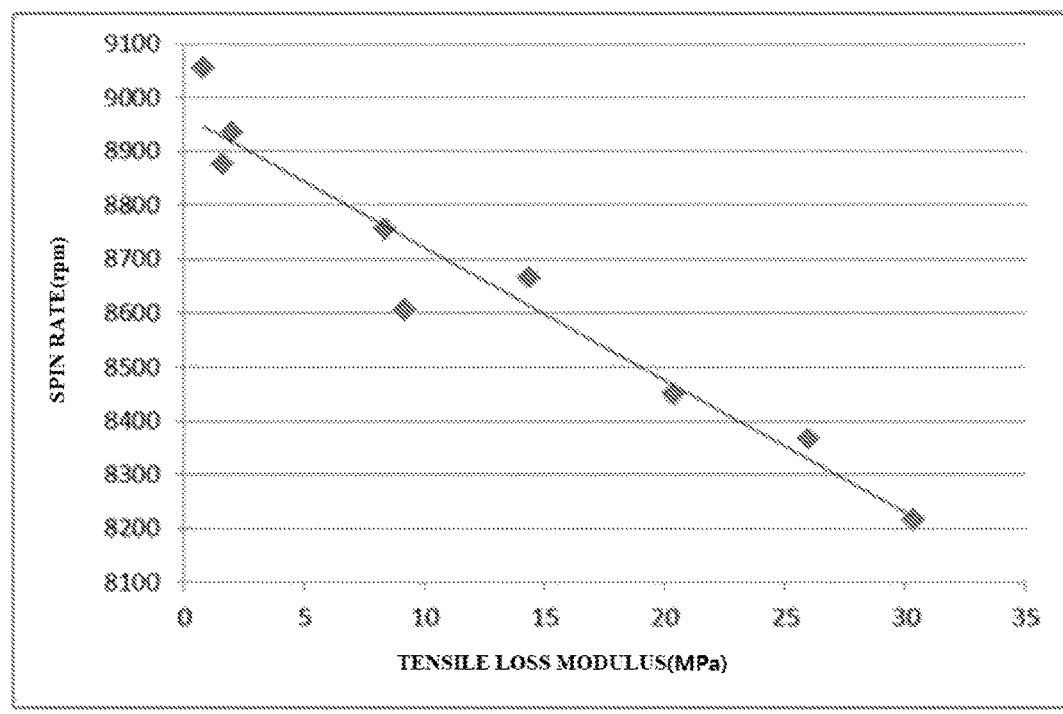
FIG. 3 is a graph of a spin rate of a golf ball versus a tensile loss modulus of a golf ball cover which is formed by curing the resin composition including the non-reactive oligomer prepared in Example 2.

In order to evaluate spin rates of the golf balls including the golf ball covers formed by curing the resin compositions including the non-reactive oligomer, RPM of the golf ball including the golf ball cover prepared in Example 2 was measured after hitting the ball by using a hitting machine which applied the same force with a 58° wedge, and a spin rate versus a tensile loss modulus (E) is illustrated in FIG. 3.

TABLE 2

|  | Example 2 | Comparative Example 2 |
|---|---|---|
| Storage modulus at −10° C. ($E'_{-10}$) | 68 MPa | 108 MPa |
| Storage modulus at 20° C. ($E'_{20}$) | 45 MPa | 52 MPa |
| Storage modulus at 50° C. ($E'_{50}$) | 40 MPa | 45 MPa |
| Value (%) of Equation 1 | 62.2% | 121.2% |
| Loss modulus at −10° C. ($E''_{-10}$) | 9.8 MPa | 23.2 MPa |
| Loss modulus at 20° C. ($E''_{20}$) | 3.1 MPa | 3.8 MPa |
| Loss modulus at 50° C. ($E''_{50}$) | 1.7 MPa | 3.0 MPa |
| Value (%) of Equation 2 | 261.3% | 531.6% |
| Ball rebound | 56% | 55% |

From the results of Table 2, values of the storage modulus (a resisting force when deformation is applied) and loss modulus (a lost force when deformation is applied) of Example 2 measured under temperature conditions of 50° C. and −10° C. were smaller than those of Comparative Example 2. Furthermore, with respect to Example 2, changes in storage and loss modulus values depending on a temperature, which were calculated according to equations 1 and 2, were also significantly lower than those of Comparative Example 2. Example 2 showed a markedly gradual slope in comparison to Comparative Example 2 in FIGS. 1 and 2. Also, since the ball rebound of Example 2 was superior to that of Comparative Example 2, it was confirmed that, according to the present invention, changes in physical properties of the ball may be minimized regardless of seasonal temperature changes and modulus properties may be improved. Furthermore, FIG. 3 shows that the spin rate of the golf ball including the golf ball cover, which was formed by curing the resin composition including the non-reactive oligomer prepared in Example 2, was maintained at an excellent level of 8,500 rpm or more although the tensile loss modulus was increased.

Accordingly, since the resin composition for a golf ball cover includes the non-reactive oligomer to improve restitution characteristics due to temperature changes, physical properties, such as elasticity, stretchability, and soft flexibility, may be excellently maintained, and thus, it is expected that performance deviations of the golf ball due to seasonal temperature changes may be minimized and the spin rate may be improved.

What is claimed is:

1. A golf ball comprising a core and a cover surrounding the core, wherein the cover comprises a two-component type resin,
   wherein the two-component type resin comprises:
   (a) an NCO-terminated prepolymer and a non-reactive composition that does not react with NCO, OH, and $NH_2$; and
   (b) an alcohol-based hardener, an amine-based hardener, or both,
   wherein the non-reactive composition is present in an amount of 5 parts by weight to 10 parts by weight based on 100 parts by weight of the prepolymer and the hardener is present in an amount of 90% to 110% of an equivalent weight of the NCO of the prepolymer;
   wherein the non-reactive composition comprises at least one oil selected from the group consisting of aromatic oil, aliphatic oil, and paraffin oil;
   wherein the non-reactive composition further comprises at least one additional compound selected from the group consisting of dioctyl terephthalate, octyl nonyl terephthalate, dibutyl maleate, diisobutyl maleate, triethylene glycol dihexanoate, tetraethylene glycol diheptanoate, and bis(2-ethylhexyl)terephthalate;
   wherein the prepolymer is obtained by reaction of at least one isocyanate selected from the group consisting of naphthalene-1,5-diisocyanate, paraphenylene diisocyanate, tolidine diisocyanate, diphenylmethane diisocyanate, toluene diisocyanate, hexamethylene diisocyanate, dicyclohexylmethane diisocyanate, and isoporone diisocyanate with at least three polyols selected from the group consisting of polyether polyol, polyester polyol, polycarbonate polyol, and acryl polyol; and
   wherein the golf ball cover satisfies 100% or less, as a value of Equation 1, and satisfies 500% or less, as a value of Equation 2

$$\frac{\left| \text{Storage modulus at } 50° \text{C. } (E'_{50}) - \text{Storage modulus at } -10° \text{C. } (E'_{-10}) \right|}{\text{Storage modulus at } 20° \text{C. } (E'_{20})} \times 100 \quad \text{[Equation 1]}$$

$$\frac{\left| \text{Loss modulus at } 50° \text{C. } (E''_{50}) - \text{Loss modulus at } -10° \text{C. } (E''_{-10}) \right|}{\text{Loss modulus at } 20° \text{C. } (E''_{20})} \times 100. \quad \text{[Equation 2]}$$

2. The golf ball of claim 1, wherein the prepolymer has a weight-average molecular weight of 1,000 to 5,000.

3. The golf ball of claim 1, wherein the hardener comprises at least one compound selected from the group consisting of aromatic amine, aliphatic amine, aromatic alcohol, and aliphatic alcohol.

4. The golf ball of claim 1, wherein the hardener comprises at least one compound selected from the group consisting of diethyltoluenediamine, diaminodiphenyl methane, diaminodiphenyl sulphone, M-xylylene diamine, isophorone diamine, ethylenediamine, diethylenetriamine, triethylenetetramine, 4,4'-methylenebis(2-chloroaniline) (MOCA), polypropylenediamine, polypropylenetriamine, ethylene glycol, diethylene glycol, dipropylene glycol, butanediol, hexanediol, glycerine, and trimethylolpropane.

* * * * *